United States Patent [19]
Geiger et al.

[11] Patent Number: 5,499,845
[45] Date of Patent: Mar. 19, 1996

[54] PRESSURE-FLUID OPERATED RIDE LEVELER

[75] Inventors: Hartmut Geiger, Garbsen; Reinhard Gocz, Seelze; Uwe Lentz, Neustadt; Johann Lucas, Hannover; Dieter Zimpel, Neustadt, all of Germany

[73] Assignee: Wabco Standard GmbH, Hannover, Germany

[21] Appl. No.: 166,525

[22] Filed: Dec. 14, 1993

[30] Foreign Application Priority Data

Dec. 22, 1992 [DE] Germany .......................... 42 43 577.3

[51] Int. Cl.$^6$ ..................................................... B60G 11/26
[52] U.S. Cl. ............................ 280/840; 280/6.1; 280/714
[58] Field of Search ............................. 280/840, 6.1, 714

[56] References Cited

U.S. PATENT DOCUMENTS

| | | | |
|---|---|---|---|
| 4,640,526 | 2/1987 | Tanaka et al. | 280/DIG. 1 |
| 4,867,476 | 9/1989 | Yamanaka et al. | 280/714 |
| 5,312,119 | 5/1994 | Schneider et al. | 280/840 |

FOREIGN PATENT DOCUMENTS

| | | |
|---|---|---|
| 3212433 | 4/1983 | Germany . |
| 3515015 | 10/1985 | Germany . |
| 3039345 | 3/1987 | Germany . |
| 3333888 | 10/1987 | Germany . |
| 60-234016 | 11/1985 | Japan ...................................... 280/6.1 |

*Primary Examiner*—Eric D. Culbreth
*Attorney, Agent, or Firm*—Meltzer, Lippe, Goldstein et al.

[57] ABSTRACT

A pressure fluid operated ride leveler which adjusts the actual level of a vehicle body relative to a vehicle axle to a desired level, includes a pressure fluid source and a pressure fluid sink, pressure fluid chambers which support the vehicle body, and a pressure fluid conduit connecting the pressure fluid chambers to either the pressure fluid source or the pressure fluid sink. First and second controllable valve mechanisms are disposed in the pressure fluid conduit. The second valve mechanism is, e.g., a controllable throttling valve, capable of reducing the diameter of the pressure fluid conduit. Both the first and second valve mechanisms are actuated by a control unit. The control unit actuates the first valve mechanism to connect the chambers to the pressure fluid source or the pressure fluid sink based on the difference between the actual level of the vehicle body and the desired level. When the difference between the actual level and the desired level becomes less than a predetermined value, the control unit actuates the second valve mechanism, thereby reducing the diameter of the pressure fluid conduit and slowing down the delivery or withdrawal of pressure fluid. In this way, overshoot of the desired level is avoided and the number of adjustment steps is reduced.

9 Claims, 2 Drawing Sheets

PRESSURE-FLUID OPERATED RIDE LEVELER

BACKGROUND OF THE INVENTION

The invention relates to a pressure-fluid operated ride leveler allowing for the free selection of the desired level, in particular for use in vehicles.

A pressure-fluid operated ride leveler is known from DE 30 39 345 C2.

If the body of a vehicle equipped with this known ride leveler is to be lifted from a normal level (defined as a predetermined mean distance between vehicle axle and vehicle body) to a higher level (greater distance between vehicle axle and vehicle body), the driver moves a switch of an operating unit into "Lifting" position. The pressure fluid chambers of pressure-fluid-operated shock absorbers are then connected via a valve mechanism to a pressure fluid source. The pressure fluid flowing into the pressure fluid chambers produces an increase in the distance between the vehicle axle and the vehicle body. The desired level is compared with the actual level by means of sensors. If the desired level equals the actual level, the valve mechanism is caused to break the connection between the pressure fluid source and the pressure fluid chambers.

If the vehicle is to be lowered to a lower level, the amount of pressure fluid in the pressure fluid chambers is decreased via the valve mechanism into the atmosphere or to a sump.

To be able to carry out the "Lifting" and "Lowering" processes rapidly, it is necessary to use pressure fluid conduits with large diameters. Due to the rapid change in volume of pressure fluid in the pressure fluid chambers, it cannot be avoided that pressure fluid will continue to flow into the pressure fluid chambers or out of the pressure fluid chambers at the moment when equality between the desired level and the actual level is detected and the valve mechanism is actuated. As a consequence, the actual level becomes greater than the desired level during the "Lifting" process and the actual level becomes less than the desired level during the "Lowering" process. The distance between vehicle axle and vehicle body is thus greater or less than the desired distance.

In order to obtain a desired predetermined distance between vehicle axle and vehicle body, it is necessary for the above-mentioned reasons to follow an input of pressure fluid into the pressure fluid chambers during the "Lifting" process with a minor reduction of the pressure fluid in the pressure fluid chambers. Similarly, it is necessary to follow a pressure fluid reduction during the "Lowering" process with a minor addition of pressure fluid into the pressure fluid chambers. It may also be necessary to repeat this process until the actual level is equal to the desired level.

Due to this control correction, adjustment of the level of the vehicle cabin is uneven and in vehicles used for passenger transportation it is uncomfortable to the passengers. Furthermore, in air-cushioned vehicles, the air consumption is increased.

It is the object of the instant invention to improve a ride leveler of the type mentioned above in such manner that the desired level is attained with the least possible number of adjustment steps.

SUMMARY OF THE INVENTION

In accordance with the present invention, a pressure fluid operated ride leveler which adjusts the actual level of a vehicle body relative to a vehicle axle to a desired level, comprises a pressure fluid source and a pressure fluid sink, pressure fluid chambers which support the vehicle body, and a pressure fluid conduit connecting the pressure fluid chambers to either the pressure fluid source or the pressure fluid sink. First and second controllable valve mechanisms are disposed in the pressure fluid conduit. The second valve mechanism is, e.g., an adjustable throttling valve, capable of reducing the diameter of the pressure fluid conduit. The operation of the first and second valve mechanisms is controlled by a control unit. The control unit actuates the first valve mechanism to connect the chambers to the pressure fluid source or the pressure fluid sink based on the difference between the actual level of the vehicle body and the desired level. When the difference between the actual level and the desired level becomes less than a predetermined value, the control unit actuates the second valve mechanism, thereby reducing the diameter of the pressure fluid conduit and slowing down the delivery or withdrawal of pressure fluid. In this way, overshoot of the desired level is avoided and the number of adjustment steps is reduced.

The invention offers in particular the advantage that the number of control steps can be reduced by simple means and precision of control can be improved. Furthermore, in a vehicle with pneumatic shock-absorption, air consumption is reduced.

Two embodiments of the invention are explained below in greater detail through the drawings.

DETAILED DESCRIPTION OF THE INVENTION

Figure 1:
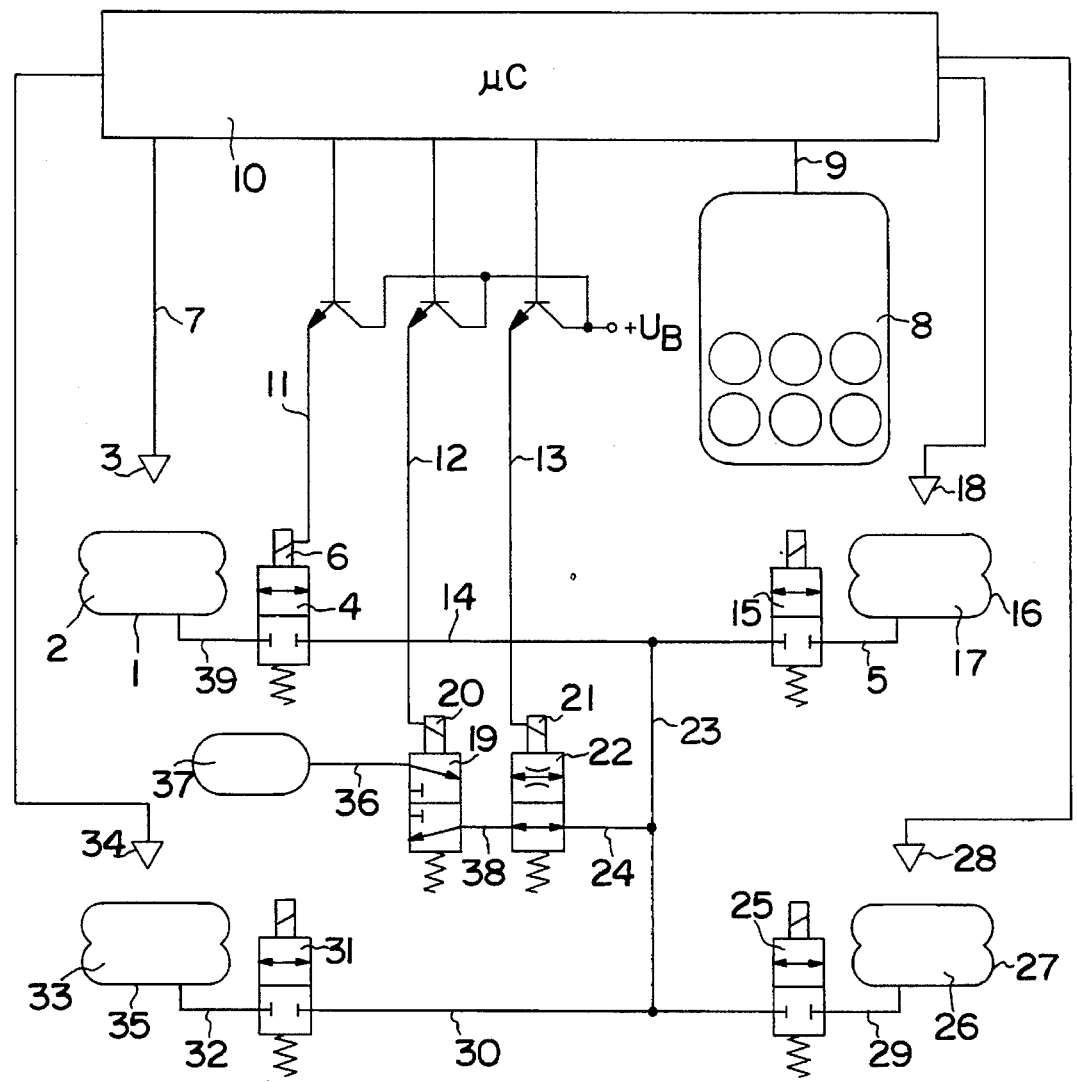
FIG. 1 schematically shows a pneumatic shock-absorption system of a vehicle with the inventive ride leveler.

The pressure-fluid operated ride leveler shown in FIG. 1 is designed for a vehicle with two axles. Each vehicle axle has two pneumatic shock absorption cushions (1, 16) and (27, 35). The vehicle cabin or the vehicle body (the cushioned part of the vehicle) is cushioned from the vehicle axle (non-cushioned part of the vehicle) by the pneumatic shock absorption cushions (1, 16, 27, 35). A pressure fluid conduit (36) leads from a pressure fluid source e.g., a reservoir (37) for compressed air, to the input of a first valve mechanism (19, 20) comprising a 2/3-way solenoid valve. The output of the first valve mechanism (19, 20) is connected via a pressure fluid conduit (38) to the input of a second controllable valve mechanism (22, 21) comprising an adjustable throttling mechanism. The input of a valve (4) made in the form of a 2/2-way solenoid valve is connected via pressure fluid conduits (24, 23, 14) to the output of the second valve mechanism (22, 21). The output of the valve (4) is connected via a pressure fluid conduit (39) to the pressure fluid chamber (2) of the first pneumatic shock absorption cushion (1). In the same manner, the input of a valve (15) made in the form of a 2/2-way solenoid valve associated with the second pneumatic shock absorption cushion (16) is connected via the pressure fluid conduit (14, 23, 24) to the output of the second valve mechanism (22, 21). A pressure fluid conduit (5) leads from the output of the valve (15) to the pressure fluid chamber (17) of the second pneumatic shock absorption cushion (16).

The outlet of a third valve (25) made in the form of a 2/2-way solenoid valve and associated with the third pneumatic shock absorption cushion (27) is connected via a pressure fluid conduit (29) to the pressure fluid chamber (26) of the third pneumatic shock absorption cushion (27). The input of valve (25) is connected to the pressure fluid conduit (23) via pressure fluid conduit (30). Pressure fluid conduit (30), which is connected to the pressure fluid conduit (23), is also connected to valve (31) made in the form of a 2/2-way solenoid valve and associated with the fourth pneumatic shock absorption cushion (35). The output of valve (31) is connected via a pressure fluid conduit (32) to the pressure fluid chamber (33) of the fourth pneumatic shock absorption cushion (35).

A first distance sensor (3) associated with the first pneumatic shock absorption cushion (1) is connected via an electric line (7) to an input of a device which detects the difference between the desired level and the actual level, and also actuates the second valve mechanism (22, 21). In the same manner, distance sensor (18) is associated with the second pneumatic shock absorption cushion (16), distance sensor (28) is associated with the third pneumatic shock absorption cushion (27), and distance sensor (34) is associated with the fourth pneumatic shock absorption cushion (35). Each of the distance sensors (18, 28, 34) is connected like the first distance sensor (3) via electric lines to an input of the device for the recognition of a difference between the desired level and the actual level and for the actuation of the second valve mechanism (22, 21). It is of course also possible to associate one sensor with each pneumatic shock absorption cushion of one axle of the vehicle and only one sensor with one pneumatic shock absorption cushion of the other axle. Instead of associating one sensor with this one pneumatic shock absorption cushion, a sensor can also be installed near the center of this other axle.

The device for the recognition of a difference between the desired level and the actual level and for the actuation of the second valve mechanism (22, 21) essentially contains an electrical evaluation and control unit (10) with a measured-value memory, a comparator and output stages. The output stages are electrically connected to the first valve mechanism (19, 20), to the second valve mechanism (22, 21) which is made in the form of an adjustable throttling mechanism and to the valves (4, 15, 25, 31) associated with the pneumatic shock absorption cushions (1, 16, 27, 35).

For the sake of greater clarity, only the electrical connections between the electrical evaluation and control unit (10) and the first valve mechanism (19, 20), the second valve mechanism (22, 21), and the valve (4) associated with the first pneumatic shock absorption cushion (1) are shown in this embodiment.

A first output stage is connected via an electric line (11) to the solenoid (6) of the valve (4) associated with the first pneumatic shock absorption cushion (1). A second output stage is connected via an electric line (12) to the solenoid (20) of the first valve mechanism (19, 20). A third output stage is connected via an electric line (13) to the solenoid (21) of the second valve mechanism (22, 21). A control device (8) in the form of an operating unit for the free selection of a desired level is connected via an electric line (9) to an input of the electrical evaluation and control unit (10).

The operation of the inventive ride leveler is explained in further detail below.

It is assumed that a vehicle is at a normal level, i.e., the vehicle axle and the vehicle body are at a mean distance from each other, or the vehicle body is at a mean distance from the road surface. The first valve mechanism (19, 20), the second valve mechanism (22, 21) in the form of a switchable throttling mechanism, and the valves (4, 15, 25, 31) associated with the pneumatic shock absorption cushions (1, 16, 27, 35) do not receive any control signals. The connection going from the pressure fluid reservoir (37) to the second valve mechanism (22, 21) and thereby to the valves (4, 26, 25, 31) is interrupted by the first valve mechanism (19, 20). The pressure fluid conduits (14, 23, 30, 24) connected to the inputs of the valves (4, 15, 25, 31) are vented to the atmosphere via the second valve mechanism (22, 21), the pressure fluid conduit (38) and the first valve mechanism (19, 20). The valves (4, 15, 25, 31) are closed so that the connection between the pressure fluid conduits (14, 23, 30, 24) and pressure fluid conduits (39, 5, 29, 32) connecting the outputs of the valves (4, 15, 25, 31) to the pressure fluid chambers (2, 17, 26, 33) of the pneumatic shock absorption cushions (1, 16, 27, 35) is interrupted. The valves (4, 15, 25, 31) and the second valve mechanism (22, 21) are not under any pressure. The second valve mechanism (22, 21) is now in a configuration with its largest passageway cross-sectional diameter.

If the vehicle is to be raised to a level above the normal level, i.e., if the distance between vehicle axle and vehicle body is to be increased, the driver of the vehicle moves a switch of the control unit (8) to the "Lifting" position.

The signal for the "Lifting" process transmitted from the operating unit (8) actuates the computer of the evaluation and control system (10). The desired level value stored in the memory and representing a defined upper vehicle level is compared to the actual level value representing the momentary vehicle level. If a great difference exists between the desired level value and the actual level value, the output stages of the electrical evaluation and control unit (10) transmit switching signals to the valves (4, 15, 25, 31) associated with the four pneumatic shock absorption cushions (1, 16, 27, 35) and to the first valve mechanism (19, 20). The four valves (4, 15, 25, 31) and the first valve mechanism (19, 20) switch over in such manner that the passageways (39, 5, 29, 32) between the pressure fluid chambers (2, 17, 26, 33) and the valves (4, 15, 25, 31) are opened, and the pressure fluid conduits (38, 24, 23, 14) are closed off against the atmosphere and are connected to the pressure fluid conduit (36) going to the reservoir (37). From the reservoir (37) pressure fluid flows through the pressure fluid conduit (36), the first valve mechanism (19, 20) set for passage, the pressure fluid conduit (38), the passageway with the large diameter of the second valve mechanism (22, 21), the pressure fluid conduits (24, 23, 14, 30) and the valves (4, 15, 25, 31) set for passage as well as through the pressure fluid conduits (39, 5, 9, 32) into the pressure fluid chambers (2, 17, 26, 33) of the pneumatic shock absorption cushions (1, 16, 27, 35).

The pressure fluid flowing into the pressure fluid chambers (2, 17, 26, 33) of the pneumatic shock absorption cushions (1, 16, 27, 35) causes the pneumatic shock absorption cushions (1, 16, 27, 35) to expand in the direction of their longitudinal axes. The distance between the vehicle axles and the vehicle body increases. The change in the distance between the vehicle axles and the vehicle body is detected by the distance sensors (3, 18, 28, 34) and is transmitted in the form of a changing inductivity as an actual level value to the computer of the evaluation and control unit (10). This changing actual level value is constantly compared with the stored desired level value.

When the difference between the desired level value and the actual level value has decreased to a value stored in memory, the electrical evaluation and control unit (10) transmits a control signal to the second valve mechanism (22, 21) which is in the form of a switchable throttling mechanism. The second valve mechanism (22, 21) thereupon switches over to the passageway with the smaller diameter. The diameter of the pressure fluid conduit (24) thereby decreases.

The pressure fluid flow going from the reservoir (37) to the pressure fluid chambers (2, 17, 26, 33) of the pneumatic shock absorption cushions (1, 16. 27, 35) is now throttled. As a result, the subsequent pressure fluid feed to the pressure fluid chambers (2, 17, 26, 33) of the pneumatic shock absorption cushions (1, 16, 27, 35) is slowed from then on.

As soon as the actual level value measured by distance sensors (3, 18, 28, 34) is equal to the desired level value, the switching signals at the valves (4, 15, 25, 31), at the first valve mechanism (19, 20), and at the second valve mechanism (22, 21) taper off. The valves (4, 15, 25, 31) are placed again in a closed position. In the same manner, the first valve mechanism (19, 20) and the second valve mechanism (22, 21) switch over. The first valve mechanism (19, 20) connects the pressure fluid conduits (38, 24, 23, 30, 14) to the atmosphere and shuts off the pressure fluid conduit (36) from the reservoir (37). The second valve mechanism (22, 21) switches back to the large diameter passageway.

When the driver of the vehicle actuates the "Normal Level" switch, the desired value for normal level stored in the memory is compared in the computer system of the evaluation and control unit (10) with the momentary actual level value. If a great difference is found between the desired level value and the actual level value, the evaluation and control unit (10) transmits a switching signal to the valves (4, 15, 25, 31).

The valves (4, 15, 25, 31) are brought into open position. The pressure fluid in the pressure fluid chambers (2, 17, 26, 33) of the pneumatic shock absorption cushions (1, 16, 27, 35) is decreased through the large diameter passageway of the second valve mechanism (22, 21) and the first valve mechanism (19, 20). The reduction in size of the pneumatic shock absorption cushions (1, 16, 27, 35) in the direction of their longitudinal axes caused thereby leads to a reduction of the distance between the vehicle body and the vehicle axles.

When the difference between the desired level value and the actual level value has been reduced to a predetermined stored value, the electrical evaluation and control unit (10) transmits a switching signal to the second valve mechanism (22, 21). The second valve mechanism (22, 21) switches over to its smaller diameter passageway. Further decrease of the pressure fluid quantity in the pressure fluid chambers (2, 17, 26, 33) of the pneumatic shock absorption cushions (1, 16, 27, 35) is now slowed down.

When equality has been reestablished between the desired level value stored in the memory and the actual level value for the normal level state, the switching signals at the valves (4, 15, 25, 31), at the first valve mechanism (19, 20), and at the second valve mechanism (22, 21) taper off. The valves (4, 15, 25, 31) are brought back into closed position. The pressure fluid chambers (2, 17, 26, 33) of the pneumatic shock absorption cushions (1, 16, 27, 35) are now shut off again from the pressure fluid conduits (14, 23, 24, 30) leading to the second valve mechanism (22, 21). The first valve mechanism (19, 20) switches over in such manner that the connection between the reservoir (37) and the second valve mechanism (22, 21) is interrupted and the pressure fluid conduits (14, 23, 30, 24) are connected via the second valve mechanism (22, 21), the pressure fluid conduit (38), and the first valve mechanism (19, 20) to the atmosphere. The second valve mechanism (22, 21) has again switched over to the large diameter passageway.

When the vehicle is to be brought to a level that is below the normal level, the driver of the vehicle actuates a switch of the operating unit (8) for the "Lowering" process. The desired level value representing the lower desired level which is stored in the memory is compared in the computer system of the evaluation and control unit (10) with the momentary actual level value representing the normal level state. Because of the great difference between the desired level value and the actual level value, the valves (4, 15, 25, 31) are actuated. The valves (4, 15, 25, 31) switch over to allow passage of pressure fluid. The first valve mechanism (19, 20) is not actuated since the switch of operating unit (8) has been actuated for the "Lowering" process and since no connection is therefore desired between the reservoir (37) and the pressure fluid chambers (2, 17, 26, 33) of the pneumatic shock absorption cushions (1, 16, 27, 35). Since the second valve mechanism (22, 21) also has not received any switching signal, it remains in its switched position for the large diameter passageway. The quantity of pressure fluid in the pressure fluid chambers (2, 17, 26, 33) of the pneumatic shock absorption cushions (1, 16, 27, 35) is decreased via the large diameter passageway of the second valve mechanism (22, 21), and the pressure fluid outlet of the first valve mechanism (19, 20) leading into the atmosphere.

When the computer system of the electrical evaluation and control unit (10) recognizes that only a predetermined small difference remains between the desired level value and the momentary actual level value, the electrical evaluation and control unit (10) transmits a switching signal to the second valve mechanism (22, 21). The second valve mechanism (22, 21) switches over to the small diameter passageway. The further decrease of pressure fluid quantity in the pressure fluid chambers (2, 17, 26, 33) of the pneumatic shock absorption cushions (1, 16, 27, 35) is now slowed. As soon as equality exists between the desired level value and the actual level value, the switching signals at the valves (4, 15, 25, 31) and at the second valve mechanism (22, 21) taper off. The valves (4, 15, 25, 31) return to closed position and the second valve mechanism (22, 21) switches back to the large diameter passageway.

When the "Normal Level" switch is now actuated, the valves (4, 15, 25, 31) are switched over for passage. At the same time the first valve mechanism (19, 20) switches over so that the connection between the pressure fluid chambers (2, 17, 26, 33) of the pneumatic shock absorption cushions (1, 16, 27, 35) and the atmosphere is interrupted and the pressure fluid chambers (2, 17, 26, 33) are connected to the reservoir (37). Pressure fluid flows into the pressure fluid chambers (2, 17, 26, 33) of the pneumatic shock absorption cushions (1, 16, 27, 35). The enlargement of the pneumatic shock absorption cushions (1, 16, 27, 35) in the direction of their longitudinal axes caused by this leads to an increase of the distance between vehicle axles and vehicle body. When the difference between the desired level value and actual level value has decreased to a predetermined value stored in the memory of the computer system of the evaluation and control unit (10), the electric evaluation and control system (10) transmits a switching signal to the second valve mechanism (22, 21).

The second valve mechanism (22, 21) switches over to the small diameter passageway. Continued supply of pressure fluid to the pressure fluid chambers (22, 17, 26, 33) of the pneumatic shock absorption cushions (1, 16, 27, 35) is now slowed down. As soon as equality between the desired level value and the actual level value is reached, the switching signals taper off at the valves (4, 15, 25, 31), as well as at the first valve mechanism (19, 20) and at the second valve mechanism (22, 21). The valves (4, 15, 25, 31) are brought into closed position and the first valve mechanism (19, 20) switches over in such manner that the pressure fluid conduits (38, 24, 23, 30, 14) leading from the pressure fluid outlet of the first valve mechanism (19, 20) to the pressure fluid inlets of the valves (4, 15, 25, 31) are shut off from the reservoir (37) and are connected to the pressure fluid outlet of the first valve mechanism (19, 20) letting out to the atmosphere. The second valve mechanism (22, 21) switches back to the large diameter passageway.

The electrical evaluation and control unit (10) essentially contains a memory, a computer system, an input system and an output. The operating unit (8) and the distance sensors (3, 18, 28, 34) are connected to the input system. The output is connected via the output stages to the valves (4, 15, 25, 31), to the first valve mechanism (19, 20), and to the second valve mechanism (22, 21). Desired level values for "Normal Level," "Upper Level," and "Lower Level" are stored in the memory. The memory furthermore stores values which are below and above the desired level values by a predetermined amount, i.e., which represent a predetermined difference from the desired level values.

If the difference between the desired level value and the actual level value is greater than the predetermined difference during a levelling adjustment process or during a "Lifting" or "Lowering" procedure, the second valve mechanism is switched over to the large diameter passageway. If the difference between the desired level value and the actual level value is less than the predetermined difference, the second valve mechanism is switched over to the small diameter passageway.

It is of course also possible to provide a switching system with several switching points between the vehicle axle and the vehicle body. Such a switching system may contain a first switching point for normal level, a second switching point for upper level, and a third switching point for lower level, as well as two additional switching points associated with each of these switching points and located above or below the switching points normal level, upper level, and lower level.

Figure 2:
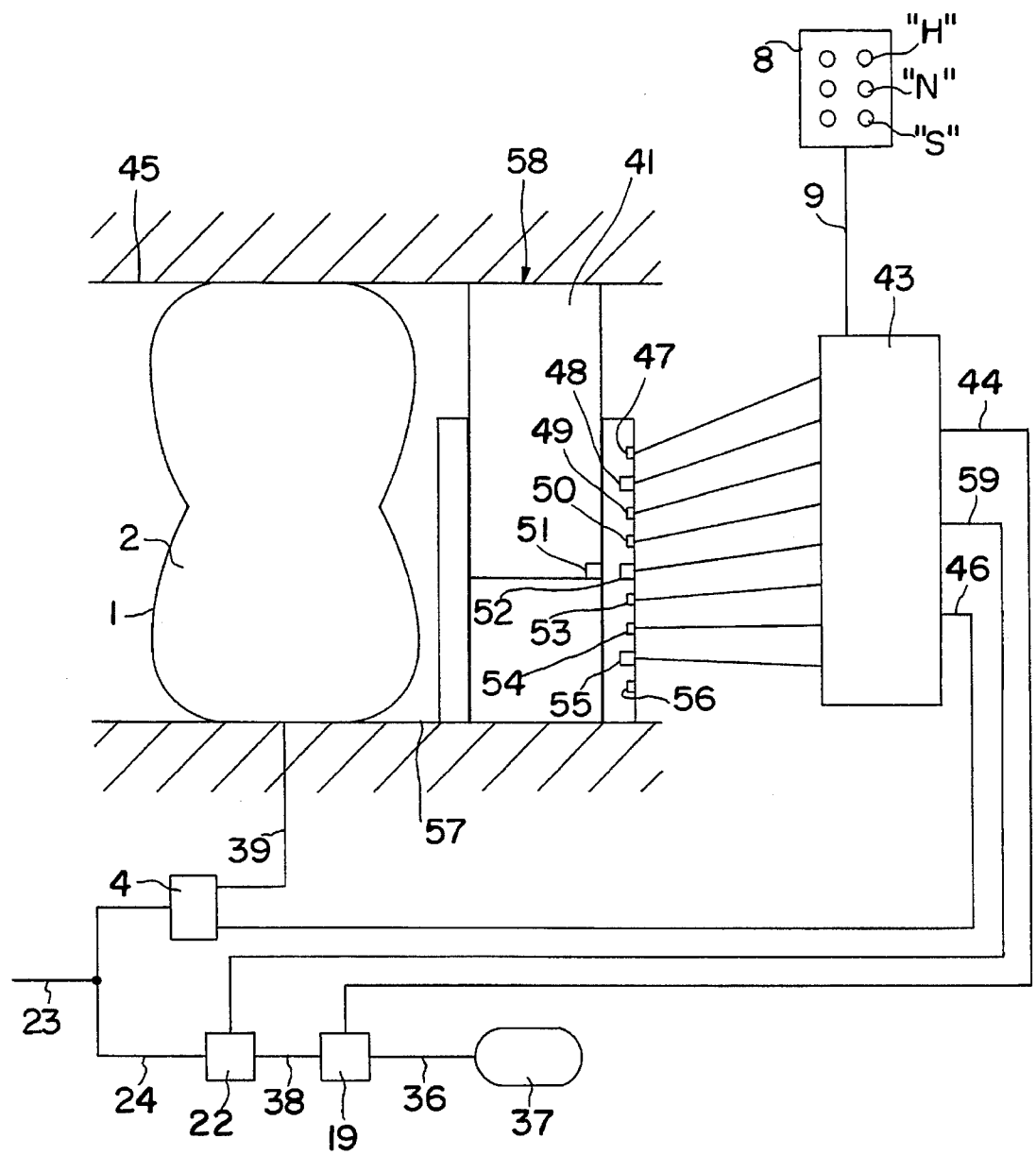
FIG. 2 shows a device for the recognition of the level of a vehicle and for initiating a control procedure for the valve mechanisms.

A simplified drawing of a ride leveler of this latter type is shown in FIG. 2. For the sake of greater clarity the components identical with the components of FIG. 1 have been given the same reference numbers.

FIG. 2 merely shows one pneumatic shock absorption cushion located between vehicle axle and vehicle body which is representative of the other pneumatic shock absorption cushions.

The pneumatic shock absorption cushion (1) containing a pressure fluid chamber (2) is installed between the non-cushioned part (57) and the cushioned part (45) of a vehicle. A pressure fluid conduit (36) leads from a reservoir (37) for pressure fluid to the input of a first controllable valve mechanism (19). The output of the first valve mechanism (19) is connected via a pressure fluid conduit (38) to the input of a second valve mechanism (22) made in the form of a controllable throttling valve. The input of a valve (4) associated with the pressure fluid chamber (2) is connected via a pressure fluid conduit (24) to the output of the second valve mechanism (22). The pressure fluid chamber (2) of the pneumatic shock absorption cushion (1) is connected via a pressure fluid conduit (39) to the output of the valve (4). A pressure fluid conduit (23) is connected to the pressure fluid conduit (24), said pressure fluid conduit (23) leading to the inputs of valves associated with the three pressure fluid chambers of the other pneumatic shock absorption cushions of the vehicle which are not shown here.

A device (58) serving as a distance sensor comprises a first component (42), namely a pipe which is attached to the non-cushioned part of the vehicle, and a second component (41), namely, a second pipe which is installed on the cushioned part of the vehicle and extends into the first component (42). The first component (42) is provided with level markings (47, 48, 49, 50, 52, 53, 54, 55, 56) in the form of Hall sensors on a side as shown in FIG. 2. A permanent magnet (51) is located on the second component (41) on a side of the second component (41) as shown in FIG. 2.

The Hall sensor (52) represents the desired level value for "Normal Level," the Hall sensor (48) represents the desired level value for "Upper Level" and the Hall sensor (55) represents the desired level value for "Lower Level". The Hall sensors (47, 49, 50, 53, 54, 56) located above and below the Hall sensors (48, 52, 55) which represent defined levels serve as switching thresholds for the switching of the second valve mechanism (22) when a predetermined difference exists between the desired level value and the actual level value during a level adjustment process or during the processes of "Lifting" or "Lowering".

The Hall sensors (47, 48, 49, 50, 52, 53, 54, 55, 56) are connected via electric lines to logic unit (43). An electric line (46) goes from a first output of the logic unit (43) to the valve (4) associated with the pressure fluid chamber (2). The second valve mechanism (22) is connected via an electric line (45) to a second output of logic unit (43). A third output of the logic unit (43) is connected via an electric line (44) to the first valve mechanism (19). The operating unit (8) is connected via an electric line (9) to an input of logic unit (43).

The logic unit (43) contains logic blocks which are interconnected in such manner that signals coming from the Hall sensors (47) and (49) can only lead to a signal controlling the second valve mechanism (22) if the "U" switch for the "Lifting" procedure on the operating unit (8) has been actuated. In the same manner, signals coming from the Hall sensors (50, 53) can lead to signals controlling the second valve mechanism (22) only if the switch "N" for "Normal Level" has first been actuated on the operating unit (8). Signals coming from the Hall sensors (54) and (56) can lead to a signal controlling the second valve mechanism (22) only if the switch "L" for the "Lowering" procedure has first been actuated on the operating unit (8).

The operation of the above-described ride leveler is explained in further detail below.

If the vehicle is at normal level (predetermined mean distance between vehicle axle and vehicle body), the distance sensor (58) is in the position shown. The permanent magnet (51) is across from the Hall sensor (52). The valve (4) is in closed position. Pressure fluid chamber (2) of pneumatic shock absorption cushion (1) closed off from the pressure fluid conduit (24). The second valve mechanism (2) has assumed its "large diameter passageway" switching position. The first valve mechanism (19) is in the switching position in which the pressure fluid conduits (24, 38) are connected with the atmosphere, and the reservoir (37) is shut off from the pressure fluid conduit (38) leading to the second valve mechanism (22) and of course also from the atmosphere.

If the vehicle is to be lifted to a higher level, the driver actuates the "U" switch. A switching signal is transmitted by the logic unit (43) to the valve (4) and to the first valve mechanism (19). The valve (4) made in the form of a 2/2-way solenoid valve and the first valve mechanism (19) made in the form of a 3/2-way solenoid valve are switched over in such manner that the passageway of the first valve mechanism (19) letting out into the atmosphere is closed off and the pressure fluid output connected to the second valve mechanism (22) is opened. Pressure fluid flows from the reservoir (37) through the pressure fluid conduit (36), the first valve mechanism (19) switched for passage, the pressure fluid conduit (38), the passageway of larger diameter of the second valve mechanism (22), the pressure fluid conduit (24), the valve (4) switched for passage, and the pressure fluid conduit (39) into the pressure fluid chamber (2) of the pneumatic shock absorption cushion (1).

Due to the increase in pressure fluid quantity in the pressure fluid chamber (2), the pneumatic shock absorption cushion (1) increases in size in the direction of its longitudinal axis. This causes the distance between the non-cushioned part (57) and the cushioned part (45) of the vehicle also to be increased. The second component (41) of the distance sensor (58) is taken along by the cushioned part (45) of the vehicle. The permanent magnet (51) installed on the second component (41) is moved past the Hall sensor (50) in the direction of the Hall sensor (48). When the permanent magnet (51) is at the level of the Hall sensor (49), the logic unit (43) transmits a switching signal via the electric line (59) to the second valve mechanism (22). The second valve mechanism (22) switches over to the smaller diameter passageway. The pressure fluid flowing from the reservoir (37) to the pressure fluid chamber (2) of the pneumatic shock absorption cushion (1) is now throttled. The vehicle cabin now continues to be lifted but at a slower pace than before.

When the permanent magnet (51) connected to the second component (41) has reached the level of the Hall sensor (48), a signal representing the upper vehicle level is transmitted from the Hall sensor (48) to the logic unit (43). The switching signals at the valve (4), at the first valve mechanism (19), and at the second valve mechanism (22) taper off. The pressure fluid chamber (2) of the pneumatic shock absorption cushion (1) is closed off from the pressure fluid conduits (36, 38, 24) coming from the reservoir (37) by means of valve (4). The first valve mechanism (19) switches over in such manner that the pressure fluid conduits (24) and (38) are vented to the atmosphere, and the pressure fluid conduit (36) coming from the reservoir is closed off from the pressure fluid conduits (38) and (24). The second valve mechanism (22) switches back to its large diameter passageway.

If the vehicle is to be lowered to a lower level, the driver of the vehicle actuates the switch "L" on the operating unit (8). The logic unit (43) transmits a switching signal to valve (4). Valve (4) is placed in open position so that pressure fluid is evacuated from the pressure fluid chamber (2) of the pneumatic shock absorption cushion (1) via the open valve (4) and the second valve mechanism (22) with the larger diameter passageway, as well as the first valve mechanism (19) into the atmosphere. The distance between vehicle axle and vehicle body decreases. The permanent magnet (51) attached to part (41) of the distance sensor (58) is moved past the Hall sensors (49, 50, 52, 53, 54) in the process. The signals transmitted by the Hall sensors (49, 50, 52, 53, 54) to the logic unit (43) are not retransmitted by said logic unit (43) as switching signals to the second valve mechanism (22) since the condition of the switch in position "U" for the "Lifting" process or the condition of the actuation of the switch in position "N" for the process "Taking vehicle to Normal Level" does not apply.

When the permanent magnet (51) reaches the level of the Hall sensor (54), the logic unit (43) transmits a switching signal to the second valve mechanism (22). The second valve mechanism (22) switches over to the small diameter passageway. The flow of pressure fluid from the pressure fluid chamber (2) of the pneumatic shock absorption cushion (1) is now throttled. The vehicle body now continues to be lowered but at a slower pace. As soon as the permanent magnet (51) reaches the Hall sensor (55), the logic unit (43) transmits a switching signal to the valve (4) and to the second valve mechanism (22). The valve (4) closes off the connection between the pressure fluid chamber (2) of the pneumatic shock absorption cushion (1) and the second valve mechanism (22). The second valve mechanism (22) switches over to its larger diameter passageway.

If the vehicle is to be brought back to normal level, the driver actuates the switch "N" of the operating unit (8). The logic unit (3) transmits switching signals to the first valve mechanism (19) and to the valve (4). The valve (4) switches for passage and the first valve mechanism (19) switches over in such manner that the pressure fluid conduits (39, 24) and (38) are shut off from the atmosphere and are connected via the pressure fluid conduit (36) to the reservoir (37). Pressure fluid flows from the reservoir (37) via the first valve mechanism (19), the second valve mechanism (22) with the larger diameter passageway and valve (4) into the pressure fluid chamber (2) of the pneumatic shock absorption cushion (1). The increase in pressure fluid quantity in the pressure fluid chamber (2) of the pneumatic shock absorption cushion (1) causes the vehicle body to be lifted so that the distance between vehicle axle and vehicle body increases.

In this process, the permanent magnet (51) attached to part (41) of the distance sensor (58) is taken past the Hall sensor (54). The condition of switch "L" actuated for "Lower Vehicle" is not met so that the logic unit (43) will not transmit any switching signal to the second valve mechanism (22). When the permanent magnet (51) has reached the level of the Hall sensor (53), the logic unit (43) transmits a switching signal to the second valve mechanism (22). The second valve mechanism (22) switches over to the small diameter passageway. The pressure fluid coming from the reservoir (37) is now throttled as it flows into the pressure fluid chamber (2) of the pneumatic shock absorption cushion (1). Continued lifting of the vehicle body now occurs at a slower pace.

As soon as the permanent magnet (51) and the Hall sensor (2) are at the same level, the logic unit (43) transmits switching signals to the first valve mechanism (19), the valve (4) and the second valve mechanism (22). Valve (4) now shuts off the pressure fluid chamber (2) of the pneumatic shock absorption cushion (1) against the pressure fluid conduit (24) leading to the first valve mechanism (19). The first valve mechanism (19) switches over in such manner that the pressure fluid conduits (24) and (38) are connected to the atmosphere, and the connections between the reservoir (37) and the pressure fluid conduit (38) going to the second valve mechanism (22) are broken. The second valve mechanism (22) switches over to its larger diameter passageway.

The distance sensor (58) mentioned above is equipped with Hall sensors (47, 48, 49, 50, 52, 53, 54, 55) serving as switching elements and interacting with a permanent magnet (51) which also serves as a switching element. Instead of these means and switching elements, it is of course also possible to use different means for the recognition of predetermined levels and different switching elements. These means may be mechanical switching devices for example, or also optical/electrical means.

The distance sensor can be separated from the pneumatic shock absorption cushion (1) and be located between vehicle axle and vehicle cabin or body, but it could also be installed in a pneumatic shock absorption leg of a vehicle. The shock absorbers using pressure fluid which are used to cushion the vehicle could be pneumatic shock absorption cushions as well as hydro-pneumatic shock absorption cushions. It would also be possible to provide a pressure fluid chamber (telescopic cylinder with a pressure-fluid filled cushion) between the vehicle body and a spring element installed on the vehicle body, e.g., a leaf spring, or between the vehicle axle and a spring element on the vehicle body.

The second valve mechanism can be designed as a switchable throttling device located in the pressure fluid conduit connecting the pressure fluid chambers to the pressure fluid source and/or to the pressure fluid sink. It is also possible, however, to combine the first valve mechanism and the second valve mechanism into a valve mechanism made in the manner of a 3/4-way valve.

The second valve mechanism can also be designed so as to be provided with an input for the pressure fluid coming from the pressure fluid source through the first valve mechanism and with an output connected to the pressure fluid conduit leading to the pressure fluid chambers, as well as with two passageways with different cross-sections. Means may also be provided by which the output can be connected to the input selectively via the larger or the smaller diameter passageways.

It is also possible to use a second valve mechanism of such type that the passageway cross-section can be changed continuously or in more or less small increments, e.g., by means of an adjustable diaphragm.

The sensors and the evaluation and control unit must then be designed so that the valves receive control signals either immediately or after a predetermined difference value is reached when a difference occurs between the desired level value and actual value.

The ride leveler according to the invention can be operated with gaseous as well as with liquid pressure fluids.

While the invention has been described by reference to specific embodiments, this was for purpose of illustration only. Numerous alternative embodiments will be apparent to those skilled in the art and are considered to be within the scope of the present invention.

We claim:

1. A pressure fluid operated ride leveler for adjusting an actual level of a vehicle body relative to a vehicle axle to a desired level, said ride leveler comprising, a pressure fluid source and a pressure fluid sink, at least one pressure fluid chamber which supports said vehicle body, a pressure fluid conduit connecting said pressure fluid chamber to said pressure fluid source and said pressure fluid sink, said pressure fluid conduit having a cross-sectional size, a first controllable valve mechanism disposed in said pressure fluid conduit, a second controllable valve mechanism disposed in said fluid pressure conduit having means for modifying the cross-sectional size of said pressure fluid conduit, and control means connected to said first and second valve mechanisms for actuating said first valve mechanism to connect said pressure fluid chamber to said pressure fluid source or to said pressure fluid sink as a function of the difference between said actual level and said desired level, and for actuating said second valve mechanism to reduce said cross-sectional size of said pressure fluid conduit when said difference decreases below a predetermined value.

2. The ride leveler of claim 1 wherein said control means includes a distance sensor which senses the distance between said vehicle body and said vehicle axle, and a logic unit which produces signals to actuate said second valve mechanism when said difference between said actual level and desired level is less than said predetermined value.

3. The ride leveler of claim 2 wherein said distance sensor comprises a first component having switching elements located on said vehicle axle, and a second component having at least one switching element on said vehicle body.

4. The ride leveler of claim 2 wherein said distance sensor comprises a switching device with a plurality of switching points including a first switching point corresponding to a normal level, a second switching point corresponding to an upper level, a third switching point corresponding to a lower level, a first intermediate switching point between said first and second switching points, and a second intermediate switching point between said first and third switching points.

5. The ride leveler of claim 1 wherein said pressure fluid chamber is part of a pressure fluid shock absorber.

6. The ride leveler of claim 1 wherein said pressure fluid chamber is part of a pneumatic shock absorption cushion.

7. The ride leveler of claim 1 wherein said second valve mechanism comprises a switchable throttle valve.

8. The ride leveler of claim 1 wherein said control means includes at least one distance sensor, an electric evaluation and control unit with a memory, a comparator, at least a first output stage electrically connected to said first valve mechanism, and at least a second output stage electrically connected to said second valve mechanism.

9. The ride leveler of claim 8 wherein said evaluation and control unit further includes one input electrically connected to a manual switching device for selecting said desired level, and one input electrically connected to said distance sensor.

* * * * *